United States Patent [19]

Williams

[11] 4,198,300
[45] Apr. 15, 1980

[54] APPARATUS FOR REMOVING SUSPENDED OIL DROPLETS FROM WATER

[75] Inventor: Robert E. Williams, Houston, Tex.

[73] Assignee: Exxon Production Research Company, Houston, Tex.

[21] Appl. No.: 24,634

[22] Filed: Mar. 28, 1979

Related U.S. Application Data

[62] Division of Ser. No. 848,961, Nov. 7, 1977.

[51] Int. Cl.² .............................................. E02B 3/20
[52] U.S. Cl. .............................. 210/170; 210/DIG. 25
[58] Field of Search ........ 210/73 W, DIG. 25, 242 S, 210/170, 221 M, 221 P, 83, 84, 115, 44; 55/45

[56] References Cited

U.S. PATENT DOCUMENTS

| | | | |
|---|---|---|---|
| 2,730,190 | 1/1956 | Brown et al. | 55/45 |
| 3,638,796 | 2/1972 | Tuggle et al. | 210/170 |
| 3,722,687 | 3/1973 | Stebbins et al. | 210/DIG. 25 |
| 3,756,409 | 9/1973 | Carmichael | 210/170 |
| 3,793,178 | 2/1974 | Austin et al. | 210/221 M |
| 3,849,311 | 11/1974 | Jabubek | 210/DIG. 25 |
| 3,893,918 | 7/1975 | Favret, Jr. | 210/170 |

Primary Examiner—Charles N. Hart
Assistant Examiner—E. Rollins Cross
Attorney, Agent, or Firm—Marc L. Delflache

[57] ABSTRACT

Suspended droplets of oil are separated from a waste water stream by the method and apparatus of the present invention. The oil and water mixture is injected into a partially submerged, vertical pipe. Gas bubbles injected into the lower end of the pipe, rise through the pipe and countercurrently contact the suspended oil droplets, thereby promoting the separation of the droplets from the waste water. The oil droplets coalesce and form a separate oil layer on top of the waste water which is readily withdrawn while clarified waste water is discharged from the lower end of the pipe. If employed to separate oil from a waste water stream on an offshore rig, the vertical pipe is submerged adjacent to the rig.

5 Claims, 1 Drawing Figure

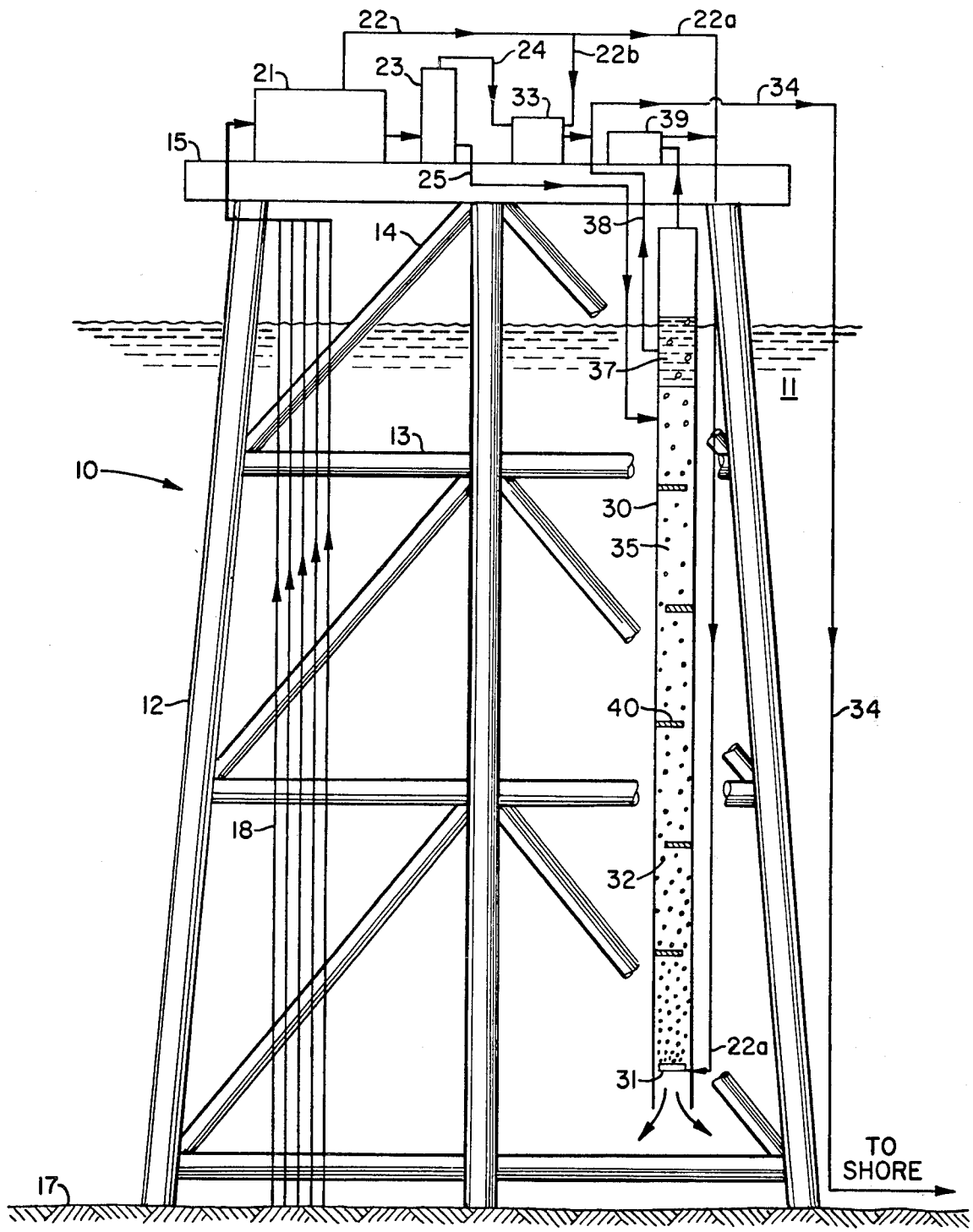

APPARATUS FOR REMOVING SUSPENDED OIL DROPLETS FROM WATER

CROSS REFERENCE TO RELATED APPLICATION

This application is a division of U.S. patent application Ser. No. 848,961, filed Nov. 7, 1977 and entitled "METHOD FOR REMOVING SUSPENDED OIL DROPLETS FROM WATER".

BACKGROUND OF THE INVENTION

1. Field of the Invention

This invention relates to the separation of oil-water mixtures. In one aspect, it relates to a method and apparatus for use in offshore operations whereby oil and water mixtures produced from an offshore well can be separated to permit the discharge of water into the sea.

2. Description of the Prior Art

Most oil and gas wells produce a certain amount of water or brine in conjunction with the oil and gas. A major problem faced in offshore oil operations is the economic separation of such oil, gas and water mixtures so that the water can be discharged back into the sea. The separated water returned to the sea must have a quality that complies with environmental discharge laws and regulations. For example, recent guidelines issued by the Federal Environmental Protection Agency requires that water discharged into the Gulf of Mexico may contain no more than 72 parts per million of oil. Conventional separation devices such as heater treaters normally discharge an aqueous effluent that typically contains 200 to 300 parts per million of oil and frequently as much as 1000 parts per million.

Numerous methods and apparatus have been employed by the offshore petroleum industry to reduce the oil concentration in produced water to environmentally acceptable limits. One approach has been to use settling vessels which rely on gravitational forces to separate oil-water mixtures. One such device specially adapted for offshore operations is the skim pile which is essentially a long vertical pipe that is adjacent to or supported by the offshore production platform. The pile normally extends from the lower deck of the platform to near the seafloor. Waste water containing oil is continuously introduced near the lower end of the pile and is permitted to separate into a relatively thin layer of oil at the top and a clarified zone of water at the bottom. The oil is withdrawn from the top of the pile while clean water flows out of the open bottom.

The major limitation of skim piles is that they can only handle relatively low flow rates. If the flow rate of waste water is too high, oil droplets cannot rise against the motion of the fluid stream. For a given flow capacity of oil bearing waste water there will be a skim pile having certain minimum dimensions capable of separating the oil-water mixture. (See, for example, D. L. Thomas, *World Oil*, Aug. 1, 1968, pp. 66–69 which sets forth a method for sizing skim piles and other separators.) For all practical purposes, the diameter of the skim pile cannot exceed 60 inches. Beyond that size, special support structures would be necessary to support the weight of the pile and absorb its movement caused by wave and current action. For example, separate support structures have been designed for large diameter caisson vessels used to separate oil-water streams produced from offshore fields in Lake Maracaibo. Such special support frames are extremely expensive and can be the deciding factor in determining whether the entire offshore structure will be economical. For most situations, skim piles will rarely be used for flow rates greater than 100 gallons per minute.

For higher waste water flow rates other types of separation equipment have been employed, for example, coalescers and gas flotation units. Fibrous media coalescers utilize a filter element to absorb and coalesce oil particles from the mixture. (See U.S. Pat. No. 3,794,583.) These devices tend to get saturated with oil and plugged with suspended solids, necessitating frequent replacement or cleansing of the filter. Corrogated plate coalescers which have no moving parts and do not use a disposable coalescing unit also tend to get plugged by suspended solids. Dismantling the unit for clean-up is time consuming and requires the availability of a back-up unit to maintain continuous production from the oil and gas fields.

Gas flotation units of the type described in U.S. Pat. No. 3,884,803 utilize high speed impellers or pressurization systems to disperse gas into the oil-water mixture. The gas bubbles contact and adhere to the oil droplets thereby greatly increasing their buoyancy and the rate at which they will rise through the oil-water mixture. The major disadvantage of gas flotation units is that they usually require large moving parts such as mixers and complex auxiliary apparatus such as pressurization chambers.

There is, therefore, a need in the art for an offshore system which can efficiently and effectively separate oil-water mixtures at high flow rates to enable the discharge of a clean, environmentally acceptable effluent stream of water.

SUMMARY OF THE INVENTION

The present invention solves the problems unresolved by the prior art by providing a system for effectively separating oil and water mixtures so as to permit the discharge of environmentally acceptable waste water. In accordance with the present invention, a long vertical pipe is substantially submerged in a body of water so that only the upper end of the pipe is above the surface. Most of the pipe extends to a submerged location substantially below the surface. When employed specifically for offshore rigs, the pipe is vertically positioned adjacent the rig.

Means are provided for injecting an oily waste water mixture into the middle portion of the pipe and for injecting gas, preferably natural gas or air, into the lower portion of the pipe. Preferably, the gas injection means includes means for diffusing the gas into dispersed bubbles. In the method of the present invention, the gas or dispersed gas bubbles injected into the lower portion of the pipe countercurrently contact and attach themselves to oil droplets in the waste water present in the pipe, thereby enhancing the gravitational separation of the suspended droplets of oil from the oil-water mixture. Means are also provided for withdrawing from the pipe, oil which coalesces and rises to the upper portion of the pipe and which collects in a separated layer atop the waste water in the pipe. Clarified waste water is permitted to be discharged into the sea from the lower, open end of the pipe.

The combination of the gravitational separation provided by the pipe and the flotation separation provided by the injected gas permits a much larger volume of oil bearing waste water to be clarified than can otherwise be achieved by conventional skim piles. The present invention employs apparatus without any moving parts or complex mechanical components and is, therefore, practically maintenance free, as compared to conventional gas flotation units which require frequent attention to ensure their proper operation.

BRIEF DESCRIPTION OF THE DRAWING

The drawing is a schematic elevational view, partly in section, showing an offshore production platform including the separation system of the present invention.

DESCRIPTION OF THE PREFERRED EMBODIMENT

The drawing shows an offshore platform 10 located in a body of water 11. Platform 10 is a fixed, bottom supported structure typical of those used for offshore drilling and production and is fabricated from a plurality of welded members including legs 12, cross braces 13 and diagonal braces 14. The structural members provide the platform with the strength necessary to support platform deck 15 and withstand the wind, waves and sea currents encountered in an offshore environment.

As depicted in the drawing, platform 10 is a production platform capable of treating and storing fluids produced from a nearby offshore field. Rising from sea floor 17 are a plurality of well conductors 18 which transport oil and gas produced from several well sites located within the offshore field. Thus, platform 10 serves as a centralized collection and processing facility for the field.

Since fluids produced from oil fields frequently contain significant quantities of water in addition to oil and gas, the production facility must be equipped to segregate the oil, gas and water mixtures into their constituents. Platform deck 15 is shown in the drawing equipped with the apparatus necessary to effect a substantial, primary separation of the produced fluids. Fluids from well conductors 18 flow into gas separator 21 which separates the produced fluids into their liquid and gaseous components. Separator 21 is essentially a low pressure settling tank which permits the lighter hydrocarbon components, primarily methane, to flash off and be withdrawn through gas line 22.

Liquid components from separator 21 then enter treater 23 which separates the liquids into an oil stream 24 and a waste water stream 25. Treater 23 is typically a heater-treater which simultaneously heats and separates the oil and waste water mixture. The application of heat to the liquid stream assists in destabilizing the oil-water mixture. Demulsifying agents can also be added at this point to help break any oil-water emulsion which may have formed as a result of excessive mixing of the oil and water components. The separation unit of the treater may consist of a combination of weirs, coalescers, baffles and skimmers which serve to gravitationally separate the oil-water mixture.

Normally, treater 23 can substantially separate the oil-water mixture. However, such separation equipment, at best, will typically discharge a waste water stream which contains anywhere from 200 to 1000 parts per million of oil. Since the waste water effluent from an offshore rig must ultimately be discharged into the sea, the oil content of the effluent has to be reduced even further to satisfy environmental regulations.

The apparatus and method of the present invention are employed to provide the necessary secondary treatment to waste water stream 25 to reduce its oil content to an environmentally acceptable level and to maximize the recovery of oil from the offshore field. The apparatus includes pipe 30 which is vertically positioned adjacent platform 10. As shown in the drawing, pipe 30 extends from a position slightly above the surface of the sea to a position substantially below the surface. The pipe should be made of high strength materials such as steel or concrete and should have an inside diameter of from about 20 inches to about 60 inches. The diameter will primarily depend on the throughput capacity of waste water stream 25 but for most offshore operations the pipe should preferably have an inside diameter of about 30 to about 50 inches. However, the actual dimensions of the pipe in terms of length and diameter, and the materials of construction will depend upon numerous design criteria including the anticipated throughput of waste water from the producing wells and the oil content in the waste water. In any event, the dimensions of pipe 30 will be smaller than conventional skim piles designed to handle comparable flow rates of waste water. This will be demonstrated in the design example that follows. Pipe 30 should be securely attached to or supported by platform 10 so that it remains in a stable position under the influence of strong wind, wave and current action. For example, the pipe can be bolted or welded to legs 12 and braces 13 and 14 to provide it with the necessary structural support.

It should be noted that for purposes of the present invention, platform 10 to which pipe 30 is secured need not be a fixed, bottom supported platform of the type shown in the drawing. Pipe 30 can be supported by any type of offshore rig or structure which can be used for oil production purposes. Such offshore rigs include conventional offshore production structures such as jack-up rigs, concrete platforms, caisson platforms, monopods and guyed towers. Moored production vessels adjacent buoyed production risers can also serve to support the apparatus of the present invention.

The lower end of pipe 30 is open to the sea to permit the discharge of clarified waste water. Within the lower end of pipe 30 is located gas diffuser 31 which disperses gas bubbles (indicated by numeral 32) into the pipe. Gas is injected into diffuser 31 from gas line 22a which is split off from the main gas line 22. The remaining gas from line 22 enters line 22b where it contacts oil stream 24. The gas and oil mixture is then fed by pump 33 into pipeline 34 for transportation to onshore processing facilities. The ratio of gas injected into diffuser 31 to that flowing into line 22b can be adjusted accordingly to permit the injection of the proper amount of gas necessary to contact the waste water.

Gas bubbles 32 dispersed into the lower end of pipe 30 counter-currently contact waste water 35 residing in the pipe 30 which is fed by waste water stream 25. Waste water stream 25 is injected into the middle portion of pipe 30, preferably the upper middle portion, so that waste water 35 has sufficient residence time within pipe 30 to be adequately contacted by gas bubbles 35. The finely dispersed gas bubbles 32 rise upwardly through pipe 30 and attach themselves to the suspended oleophilic solid particles and droplets of oil present in waste water 35. Intermolecular attraction between the gas bubbles and the oil droplets causes the bubbles to attach to the droplets. Once attached, the gas bubbles reduce the density of the oil droplets causing them to be buoyantly transported to the surface of waste water 35 in the upper end of pipe 30, thereby facilitating gravitational separation of the suspended oil droplets.

Pipe 30 cooperatively assists in the separation of the oil-water mixture by providing a long residence time for the gas flotation process. As the droplets rise through pipe 30 two events occur which enhance separation. Gas bubbles 32, attached to the droplets, are subjected to a reduced hydrostatic pressure as they rise which causes the bubbles to grow in size. The increased size of the bubbles enables them to attach to and capture more oil droplets. Secondly, as more oil droplets are contacted by the rising bubbles, the oil droplets themselves tend to contact each other and coalesce into larger more buoyant droplets. Ultimately, the oil droplets collect at the upper end of pipe 30 in a distinctly separate oil zone indicated in the drawing by numeral 37. As the oil zone forms it is continuously skimmed from pipe 30 and withdrawn through line 38 for shipment to shore. The gas bubbles continue to rise through the oil zone to the top of pipe 30. Gas exiting from the upper end of pipe 30 is repressurized to about 50 to 100 psi by compressor 39 for recycling to diffuser 31. Alternatively, the gas can be returned to gas line 22b for shipment to shore.

Coalescence of the oil droplets within pipe 30 can be promoted by employing static separating elements within the pipe. As shown in the drawing, baffles 40 are located in staggered positions along the length of pipe 30 to increase the residence time of gas bubbles 32 within the pipe and to enhance gas bubble and oil droplet contact.

During steady state operation, clarified waste water 41 is continuously discharged from the lower end of pipe 30 into the sea. This water, having been cleansed by the method and apparatus of the present invention, is substantially free of contaminating oil and should contain no more than about 10 to 20 ppm of oil.

The method of the present invention can be slightly varied to employ gases other than natural gas as the flotation medium for the oil droplets. For example, if insufficient quantities of natural gas are being produced from the wells then air or waste flue gas can be used in its place. The use of air as the flotation gas is also environmentally desirable since the oxygen in the air will assist in the purification of the waste water and is beneficial to marine organisms. However, precautions must be taken to avoid the possible formation of explosive mixtures resulting from the intermingling of oil and air, especially if light, volatile hydrocarbons are present in the oil phase. In such a situation, an inert gas such as waste flue gas may be preferred.

It should be apparent from the foregoing that the apparatus and method of the present invention offer significant ecological and practical advantages over the oil-water separation equipment known to the art. It will be appreciated that while the present invention has been primarily described with regard to the foregoing embodiments relating to offshore rigs, it should be understood that several variations and modifications may be made in the embodiments described herein without departing from the broad inventive concept disclosed herein and that the present invention may be used for a variety of oil-water separation applications.

DESIGN EXAMPLE

Illustrating the advantages of the present invention over the prior art is the following hypothetical example:

A wastewater clarification system is to be designed for an offshore field producing 20,000 barrels of fluids per day. Of the 20,000 bpd output it is estimated that 10% or 2,000 bpd is saline water, the rest being crude oil. The produced fluids will be collected at an offshore production platform where they will undergo initial separation by a heater-treater. The heater-treater will generally heat the oil-mixture to a temperature of about 150° F. If a stubborn emulsion is produced from the field, the addition of pH modifiers such as sulfuric acid or caustic soda or the addition of demulsifying agents will normally break the emulsion to permit substantial separation of the oil and water. It is anticipated that the waste water stream leaving the heater-treater will contain about 1,000 ppm of oil. Although this only represents about 2 barrels of oil per day, the waste oil stream must undergo further treatment to reduce the oil content to under 70 ppm.

In employing the apparatus of the present method or the skim piles of the prior art for further treatment, it is always essential for successful operation that the main body of waste water passing downwardly through the vertical pipe have a velocity lower than that of the rising oil droplets. Otherwise, the water will carry the oil out of the bottom of the pipe and into the sea.

In determining the proper size of either the apparatus of the present invention or of a skim pile, the most important factor is the velocity of the rising oil droplet. Based on Stokes' Law, the oil droplet velocity, $V_o$, is calculated by the equation:

$$V_o = 2.41 (l_w - l_o/\mu)$$

where
$l_w$, $l_o$ = specific gravities respectively for the water and oil coming into the separator
$\mu$ = waste water viscosity in centipoise The minimum diameter, d, of the vertical pipe is then calculated by the equation:

$$d^2 = 25(Q_w/V_o)$$

where $Q_w$ = waste water flow in gallons per minute Any diameter less than d will create a waste water flow rate in excess of the upward velocity of the oil droplet. Based on a saline waste water specific gravity of 1.05, an oil specific gravity of 0.8, and a waste water viscosity of 1.1 centipoise, the upward velocity of an oil droplet is about 0.53 feet per minute. For a waste water flow rate of 2000 barrels per day or 58 gallons per minute, the minimum diameter of a conventional skim pile pipe is calculated to be about 51 inches, which closely approaches the practical diameter limit of about 60 inches.

With the method and apparatus of the present invention, the gas bubbles countercurrently contacting the waste water, attach or adhere to the oil droplets, effectively reducing the overall density of the droplet. Since the gas bubbles are essentially weightless, a gas bubble equal in size to a suspended oil droplet to which it is attached, reduces the specific gravity of the droplet by about one half. Borrowing the design example used above for the skim pile, the effective specific gravity of an oil droplet having an attached gas bubble of equal size would be about 0.4. Keeping all of the other variables constant, the upward droplet velocity is about 1-4 feet per minute and the corresponding pipe diameter is about 32 inches or 19 inches less than the conventional skim pile diameter. Thus in this particular example, the present invention permits a 37% reduction in the diameter of the skim pile. If gas injection were to be increased to reduce the effective density of the oil droplets by more than half then even a greater reduction in pipe diameter could be achieved.

The above design example illustrates that the method and apparatus of the present invention permits either a significant reduction in pipe diameter, thereby saving construction costs, or an increased waste water capacity over the skim pile systems employed by the prior art. The present invention, therefore, provides an effective and economical waste water treatment system for offshore rigs that produce large amounts of waste water from offshore fields.

I claim:

1. Apparatus for separating oil droplets suspended in a waste water stream produced on an offshore rig comprising:

a pipe, having an upper, middle, and lower portion, vertically positioned adjacent said offshore rig in a body of water, said pipe extending from a location above the surface of said body of water to a submerged location substantially below the surface;

a line positioned vertically adjacent said pipe and extending from a location above the surface of said body of water to the lower portion of said pipe;

means for injecting said waste water stream into the middle portion of said pipe;

means for injecting gas from said line directly into the lower portion of said pipe wherein said injecting means includes a diffuser to disperse said gas into gas bubbles such that said gas bubbles countercurrently contact said waste water stream as said gas bubbles rise toward the upper portion of said pipe attaching to said oil droplets and reducing the overall density of said oil droplets sufficiently so that the upward velocity of said oil droplets is greater than the downward velocity of said waste water stream, thereby promoting the separation of said oil droplets from said waste water stream; and means for withdrawing said oil droplets from the upper portion of said pipe.

2. Apparatus of claim 1 wherein said pipe has a diameter of from about 20 to about 60 inches.

3. Apparatus of claim 1 wherein said gas is natural gas.

4. Apparatus of claim 1 wherein said gas is air.

5. Apparatus of claim 1 wherein said gas is an inert gas.

* * * * *